United States Patent [19]
Haberl

[11] Patent Number: 6,019,417
[45] Date of Patent: Feb. 1, 2000

[54] ARTICULATED DEVICE FOR ATTACHING A TOP STORAGE WELL COVER

[75] Inventor: Franz Haberl, Wallerfing, Germany

[73] Assignee: Edscha Cabrio-Verdecksysteme GmbH, Hengersberg, Germany

[21] Appl. No.: 09/227,045

[22] Filed: Jan. 7, 1999

[30] Foreign Application Priority Data

Jan. 8, 1998 [DE] Germany .......................... 198 00 384

[51] Int. Cl.⁷ ...................................................... B60J 7/20
[52] U.S. Cl. ...................................... 296/136; 296/107.08
[58] Field of Search ............................... 296/136, 107.08

[56] References Cited

U.S. PATENT DOCUMENTS

| | | | |
|---|---|---|---|
| 2,845,299 | 7/1958 | Pickering | 296/136 |
| 3,338,624 | 8/1967 | Champion | 296/136 |
| 4,819,982 | 4/1989 | Eyb | 296/107.08 |
| 5,533,777 | 7/1996 | Kleemann et al. | 296/107.08 |

FOREIGN PATENT DOCUMENTS

| | | |
|---|---|---|
| 0846584 | 6/1998 | European Pat. Off. . |
| 2696375 | 4/1994 | France . |
| 19525587 | 9/1996 | Germany . |

Primary Examiner—Gary C. Hoge
Attorney, Agent, or Firm—Brown & Wood, LLP

[57] ABSTRACT

An articulated device for attaching to a motor vehicle body of a top storage well cover pivotable about an axis provided in a region of a rear opening edge of the top storage well, between a closed position in which the cover overlaps the top storage well, and an open position in which the top storage well is freely accessible, the device including two stop members provided, respectively, on the storage well cover and on a motor vehicle body, and two articulated arms pivotally attached at their respective opposite ends to the two stop members, with each stop member having two spaced bearing elements for attachment respective ends of the two articulated arms to the two stop members, and with the two arms and the two stop members forming a four link connection.

11 Claims, 2 Drawing Sheets

ARTICULATED DEVICE FOR ATTACHING A TOP STORAGE WELL COVER

BACKGROUND OF THE INVENTION

1. Field of the Invention

The present invention relates to an articulated device for attaching to a motor vehicle body of a top storage well cover pivotable about an axis provided in a region of a rear opening edge of the top storage well, between a closed position in which the cover covers the top storage well, and an open position in which the top storage well is freely accessible.

2. Description of the Prior Art

Generally, a cover for a top storage well of a convertible motor vehicle is primarily pivotally secured in the region of the rear opening edge of the top storage well with a simple articulated device. However, frequently with such an articulated device, a problem develops which consists in that the top storage well cover has a relatively large pivotal angle region and/or pivotal radius. Because in many embodiments of convertible motor vehicles, the storage well cover is overlapped, in a closed position of the top, at least partially by the clamp clip of the top linkage, it is necessary before pivoting the storage well cover to pivot the clamp clip of the top linkage from its approximately horizontal position into an inclined, somewhat vertical position in order to provide for a free pivotal movement of the top storage well cover. Because the pivotal movement of the clamp clip and the storage well cover should be effected, in order to prevent collision, necessarily in a certain chronological order, the time of actuation of the storage well cover is noticeably increases due to the necessity to pivot the clamp clip of the top linkage by a relatively large pivotal angle.

Further, a drawback of attachment of a storage well cover with a simple articulated device consists in that with collapsible tops with rigid rear windows, upon the pivotal movement of the clamp clip, the rear window submerges deep into the passenger compartment section in the rear of the vehicle. With a large pivotal angle of the clamp clip, the submerged rear window so reduces the passenger compartment in the rear of the vehicle that the actuation of the top, with the rear of the passenger compartment being occupied by a passenger(s), is not possible without endangering the passenger or passengers.

Accordingly, an object of the present invention is an articulated device for attaching a top storage well cover to the vehicle body in which the above-discussed drawbacks are eliminated, and the manufacture of which would be cost-effective.

SUMMARY OF THE INVENTION

This and other objects of the present invention, which will become apparent hereinafter, are achieved by providing a device including two stop members provided, respectively, on the storage well cover and the vehicle body, and two articulated arms pivotally attached at their opposite ends to the stop members, with the articulated arms and the stop members forming a four-link connection.

A four-link connection insures that the storage well cover, upon being pivoted into its open position, also performs a tilting movement dependent directly on the pivotal angle, so that at the beginning of the opening phase, the storage well cover is first lifted in the region of its rear edge. Thereby, the front edge of the top storage well moves downwardly upon displacement of the storage well cover over a predetermined pivotal angle. As a result, the path curve of the front edge of the storage well cover is flattened in comparison with a conventional attachment of a storage well cover.

A flattened curvature of the trajectory in comparison with curvatures of trajectory of conventional storage well covers permits to noticeably reduce the pivot angle of the cover which is necessary for a complete access to the storage well. The reduction of the pivotal angel results, on one hand, in reduction of time necessary for lifting the cover and, on the other hand, in reduction of the space in the rear of the vehicle necessary for moving the rear window.

In an advantageous embodiment of the present invention, a distance between two attachment points of one of the articulated arms, which is determined in accordance with an operational length of the one articulated arm, differs from a distance between two attachment points of another of the articulated arms, with the two articulated arms having different pivoting radii.

A particular advantage of the two articulated arms having different swivelling or pivoting radii consists in that the tilting movement, which is superimposed on the pivotal or swivelling movement of the storage well cover, can be influenced in such a way that an optimal flat curvature of movement can be obtained with an arbitrary arrangement of the stop members on the storage well cover and the vehicle body.

According to a further advantageous embodiment of the present invention, the two bearing elements of each stop member are located one after another in a longitudinal direction of the motor vehicle in such a way that both articulated arms are arranged in two different vertical planes extending parallel to each other. At that, the distance of the two vertical planes to each other is greater than the width of one of the two articulated arms. As a result, the two articulated arms can overtake each other even with the required large pivotal angle region.

In a further preferred embodiment of the present invention, it is contemplated that both articulated arms be provided each with an elbow section at one end. These elbow sections are associated with respective support points on the vehicle body stop member and have such radii of curvature, respectively, that the rear opening edge of the storage well is overlapped, with the storage well cover in its open position, by the elbow sections of the articulated arms. This permits to obtain a maximum pivot angle of the storage well cover, without a need to provide corresponding additional means for increasing the pivot angle to be provided on the vehicle body and/or the storage well cover.

In case when the bearing elements, which are provided for attachment of the articulated arms to the vehicle body are arranged substantially one above the other, the elbow sections of the both arms and, in particular the radii of the elbow sections and their curvatures are different. As a result of different profiles of the elbow sections of the two articulated arms, both articulated arms at least partially encompass the rear opening edge of the storage well also when the bearing elements for attachment of the articulated arms of a respective stop member are offset relative to each other in both horizontal and vertical directions.

For limiting a maximum pivot angle, a stop can be provided on the stop member connected with the cover. This stop cooperates with a complementary section formed on one of the articulated arms.

When at the beginning of the opening process, as result of an unfavorable arrangement of the stop member, which is provided on the storage well cover, an unfavorable instant center of storage well cover movement is formed, and the front edge of the storage well cover does not described on optimal flat curvature, as a result of the formation of the unfavorable instant center, at least one of the articulated arms can be provided, in the region of its attachment to the storage well cover, with a slot extending in a longitudinal direction of the arm. In this slot, a hinge bolt, which is provided at the point of attachment of the arm to the storage well cover, is received. The slot provides for an additional freedom of movement of the storage well cover relatively to the arm.

In accordance with a still further advantageous embodiment of the present invention, retaining means is provided on the articulated arm with the slot for acting on the hinge bolt. The retaining means, dependent on the pivotal angle of the storage well cover, arrests or release the cover so that a tilting downward movement of the front edge of the cover, which is caused by the unfavorable instant center and which can lead to dragging of the front edge along the storage well or the vehicle body, is prevented.

According to a further development of the present invention, one of the articulated arms can be provided with a motorized drive, e.g., an electric motor, a hydraulic or pneumatic drive unit for effecting an automatic movement of the storage well cover.

BRIEF DESCRIPTION OF THE DRAWINGS

The feature and objects of the present invention will become more apparent, and the invention itself will be best understood from the following detailed description for the preferred embodiments when read with reference to the accompanying drawings, wherein.

BRIEF DESCRIPTION OF THE PREFERRED EMBODIMENT

Figure 1:
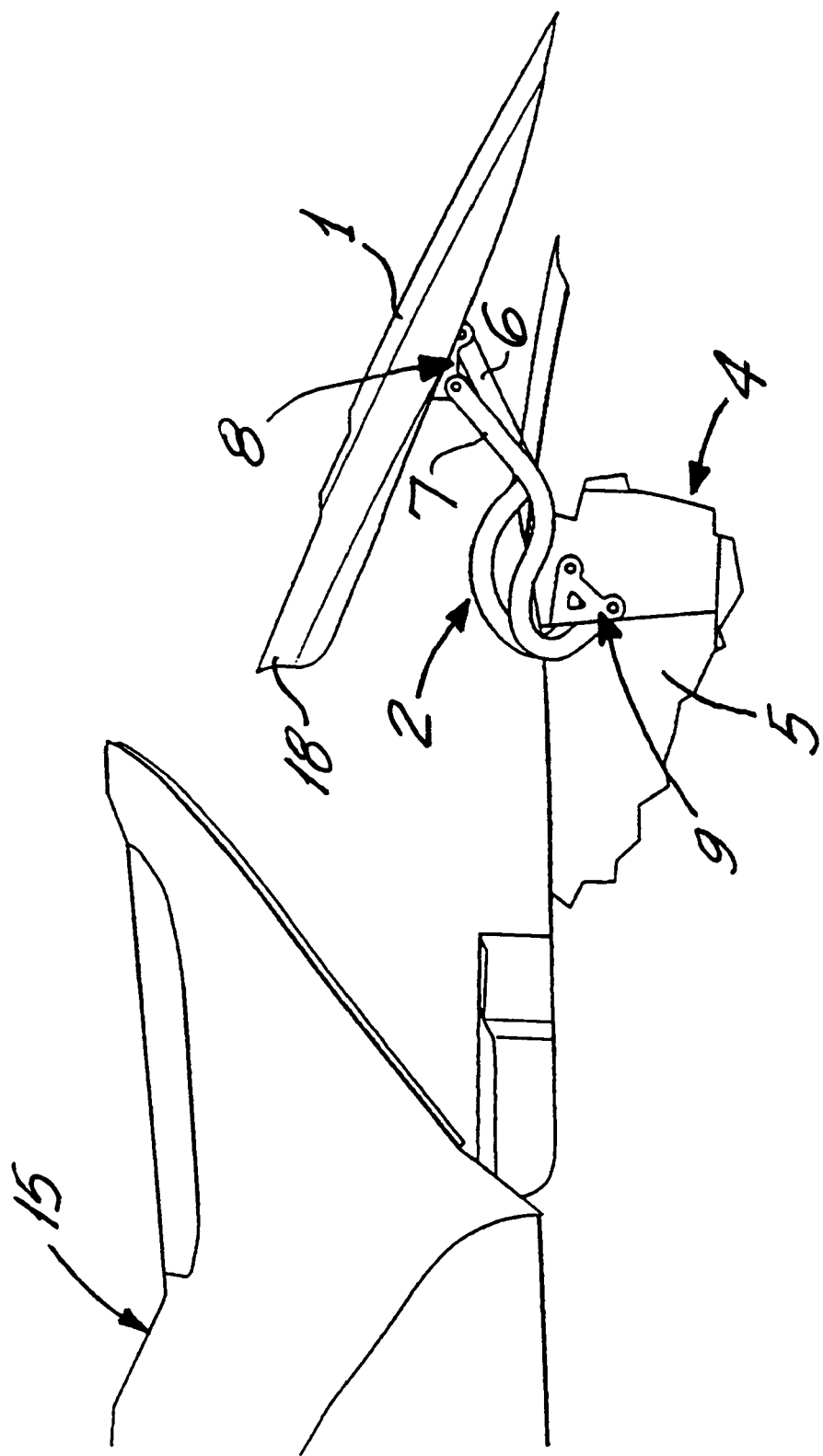
FIG. 1. shows a side view of an articulated device for attaching of a top storage well cover of a motor vehicle according to the present invention.

FIG. 1 shows an articulated attachment of a top storage well cover 1 with an articulated device according to the present invention. The storage well cover 1 is attached to a vehicle body 4 for pivotal movement about an axis located in the region of a rear opening edge 3. The storage well cover 1 is so attached that in its closed position, it overlaps a top storage well 5 and, in its open position, insures a completely free access to the storage well 5. As shown in FIG. 1, the articulated device for attaching the storage well cover 1 has two articulated arms 6, 7 which are pivotally supported, on one hand, on a stop member 8 provided on the storage well cover 1 and, on the other hand, on a stop member 9 provided on the vehicle body 4. The articulated arms 6, 7 and the stop members 8, 9 form together a four-link connection for the storage well cover 1.

Each stop member 8, 9 has two bearing elements 10, 11 for attachment of respective ends of the articulated arms 6, 7, with the two bearing elements 10, 11 of each stop member 8, 9 are offset relative to each other with regard to the three planes x, y, z. The offset of the bearing elements 10, 11 in the z-direction insures that during a pivotal movement, the two articulated arms 6, 7 can be moved past each other.

Figure 2:
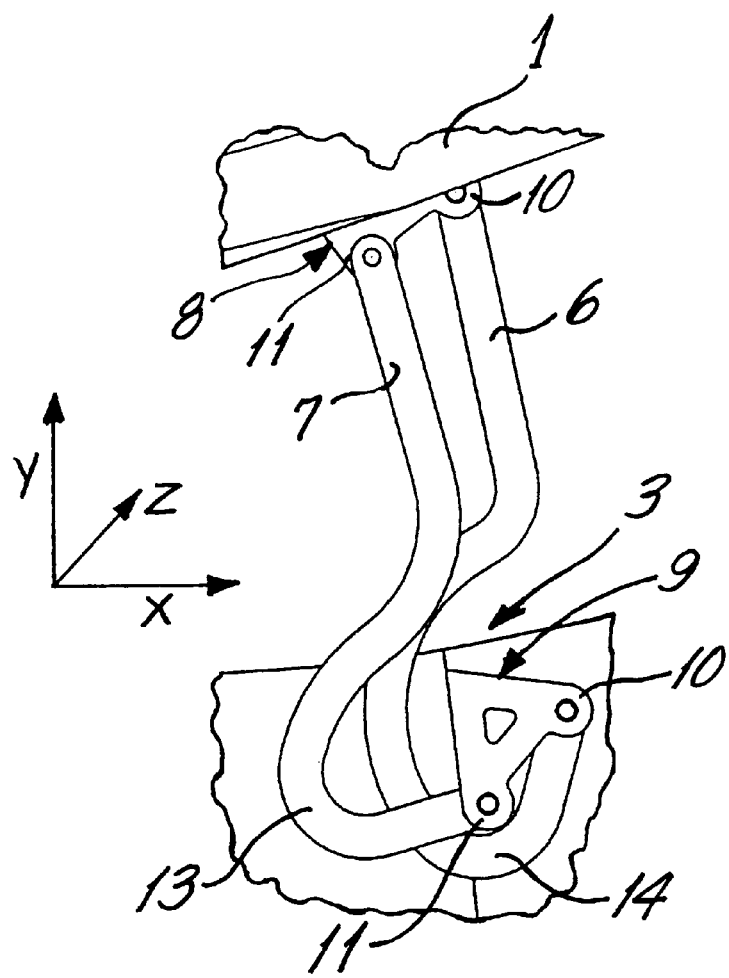
FIG. 2 shows a side view of an articulated device according to the present invention at an increased scale.

In the embodiment of the articulated device shown in FIGS. 1 and 2, both articulated arms 6, 7 have, in their end regions adjacent to the vehicle body elbow sections 13, 14, with the elbow sections 13, 14 of the two articulated arms 6, 7 being noticeably differently bent. The bent profile of the elbow sections 13, 14 of the articulated arms 6, 7 is defined, based on the contemplated position of the stop member 9, in accordance with the distance between the rear opening edge of the storage well.

Figure 3:
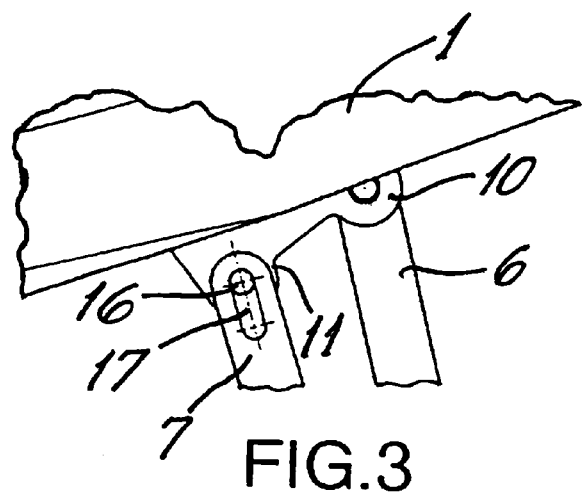
FIG. 3 shows a partial side view illustrating a variant of an articulated connection between a stop member provided on the top storage well cover and an articulated arm of an articulated device according to the present invention.

In the embodiment of the articulated device shown in FIG. 3, the front articulated arm 7 has a slot-shaped guide 17 through which a hinge bolt 16, provided on the stop member 8, extends. The slot-shaped guide 17 provides for additional translational movement of the storage well cover 1 relative to the articulated arm 7. The additional translational movement of the storage well cover 1 permits to optimally adapt the movement curve of the front edge 18 of the storage well cover 1 to the shape of the vehicle body and to the movement of the clamp clip.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An articulated device for attaching to a motor vehicle body of a top storage well cover pivotable about an axis provided in a region of a rear opening edge of the top storage well, between a closed position in which the cover overlaps the top storage well, and an open position in which the top storage well is freely accessible, the device comprising:

two stop members provided, respectively, on the storage well cover and on a motor vehicle body; and two articulated arms pivotally attached at opposite ends thereof to the two stop members, wherein each of the two stop members has two bearing elements for attachment of respective ends of the two articulated arms to a respective one of the two stop members and arranged in a spaced relationship relative to each other, wherein the two articulated arms and the two members form a four link connection, wherein the two bearing elements of each stop member are offset relative to each other with regard to three planes X, Y, Z, and wherein the stop member provided on the storage well cover has a stop cooperating with a complementary section of one of the articulated arms.

2. An articulated device as set forth in claim 1, wherein both articulated arms have each an end elbow section, with the both end elbow sections of the two articulated arms being associated with attachment points of the two articulated arms to the vehicle body.

3. An articulated device as set forth in claim 2, wherein the elbow sections of the two articulated arms have different radii of curvature, respectively.

4. An articulated device as set forth in claim 1, further comprising a motorized drive for one of the two articulated arms for automatic actuation of the storage will cover.

5. An articulated device as set forth in claim 1, wherein the distance between two attachment points of one of the articulated arms, which is determined in accordance with operational length of the one articulated arm, differs from a distance between two attachment points of another of the articulated arm, and wherein the two articulated arms have different pivoting radii.

6. An articulated device for attaching to a motor vehicle body of a top storage well cover pivotable about an axis provided in a region of a rear opening edge of the top storage well, between a closed position in which the cover overlaps the top storage well, and an open position in which the top storage well is freely accessible, the device comprising;

two stop members provided, respectively, on the storage well cover and on a motor vehicle body; and two articulated arms pivotally attached at opposite ends thereof to the two stop members, wherein each of the two stop members has two bearing elements for attachment of respective ends of the two articulated arms to a respective one of the two stop members and arranged in a spaced relationship relative to each other, wherein the two articulated arms and the two members form a four link connection, wherein at least one of the articulated arms has a slot-shaped opening extending in a longitudinal direction of the one of the articulated arms for receiving a hinge bolt provided on the stop member arranged on the storage well cover.

7. An articulated device as set forth in claim 6, wherein the two bearing elements of each stop member are offset relative to each other with regard to three planes X, Y, Z.

8. An articulated device as set forth in claim 6, wherein both articulated arms have each an end elbow section, with the both end elbow sections of the two articulated arms being associated with attachment points of the two articulated arms to the vehicle body.

9. An articulated device as set forth in claim 8, wherein the elbow sections of the two articulated arms have different radii of curvature, respectively.

10. An articulated device as set forth in claim 6, further comprising retaining means provided on the one of the articulated arms in the region of the slot-shaped opening for acting on the hinge bolt, wherein the retaining device, dependent on a pivotal angle of the storage well cover, provides for one of release and arrest of the hinge bolt, whereby tilting motion of the storage well cover is constrained during a pivotal movement of the storage well cover.

11. An articulated device as set forth in claim 6, further comprising a motorized drive for one of the two articulated arms for automatic actuation of the storage well cover.

* * * * *